Feb. 2, 1960     S. M. BABBITT     2,923,053
END MILL HAVING UNINTERRUPTED CONTINUOUSLY-CURVED FLUTE SURFACES
Original Filed Dec. 10, 1954

INVENTOR.
Seth M. Babbitt
BY
Harold F. Scribner
ATTORNEY

United States Patent Office

2,923,053
Patented Feb. 2, 1960

2,923,053

END MILL HAVING UNINTERRUPTED CONTINUOUSLY-CURVED FLUTE SURFACES

Seth M. Babbitt, Fanwood, N.J., assignor, by mesne assignments, to Eclipse Counterbore Company, Ferndale, Mich., a corporation of Michigan Original application December 10, 1954, Serial No. 474,461, now Patent No. 2,889,669, dated June 9, 1959. Divided and this application November 14, 1955, Serial No. 546,477

1 Claim. (Cl. 29—103)

This invention relates to fluted tools and the like and is concerned more particularly with an improved method and means of producing helically fluted workpieces from solid stock solely by grinding. This application is a division of my earlier filed application Serial No. 474,461, now Patent No. 2,889,669, issued June 9, 1959.

A primary aim of the invention is to produce complete flutes and accurately sized cutting edges on a tool such as an end-mill, in a bar of previously hardened end-mill stock in a single operation and in an economical and efficient manner. A further object of the invention is to develop the flutes of an end-mill or similar tool with a continuously contoured circumferential surface that runs from the cutting lip of one flute into the chip groove and forwardly over the back of a preceding flute lip to the cutting edge thereof, by a grinding operation conducted in a manner such that all rake and clearance angles and cutting edges associated with each flute are merged into a single sinusoidally curved surface.

With the aid of this invention helically fluted tools such as end mills may be produced to size from solid stock, previously hardened. Tools produced according to the method herein explained will have all necessary cutting edges, clearances and chip channels ground therein—in a single operation and embody a degree of finish and polish that is unsurpassed in any known prior tool. In accordance with the present method the bar stock for the end mill is previously heat treated to obtain the correct hardness and grain and thereafter the shank is ground to size between centers and the portion to be fluted is left a little oversize. Any distortion incident to heat treating is, therefore, corrected and the bar brought to a size before the cutting edges and flutes are formed. With the present invention the form of the tool, its number of cutting edges and flutes, the hand and lead of the helix, etc. are ground on the semifinished solid cylindrical blank.

Still another aim of the invention is to develop a method of grinding that may be practical at relatively high speeds in producing complete flutes from the solid. Heretofore, the conventional practice has been to mill out the flutes in an untreated blank first with a roughing cut and then a finishing cut followed by one or more passes of a cutter to produce the tooth land and back clearances. After milling, the tool was hardened and thereafter several more operations were required for sharpening and correcting inevitable distortion. The present invention provides an improved method and means for producing fluted tools, helical or straight, from the solid previously hardened stock in one operation at a highly efficient rate, leaving only the operation of sharpening the extreme ends of the cutting lips to follow to complete the finished product.

The method, to be explained in greater detail hereafter, may employ a work-holding spindle mounted for rotary, oscillatory, and reciprocatory movement, and a rotatable grind wheel mounted for angular adjustment relative to the axis of the work and for bodily movement toward and away from the axis of the work. A normal flute grinding operation includes the step of mounting a hardened blank in the chuck of the work spindle, setting the plane of the grind-wheel at the angle of the helix to be produced and then rapidly reciprocating and oscillating the work and causing the rotating wheel to feed slowly toward the work axis. On each reciprocatory stroke of the work spindle the work is moved axially relative to the wheel a distance equivalent to the length of the flute and simultaneously the work is moved angularly and the rapidly rotating grindwheel removes a portion of the stock. On the return reciprocatory movement of the blank its rotation is reversed and the wheel removes another portion of the stock. During the grinding of a flute the work is caused to reciprocate and oscillate at a rapid rate and with a continuously dressed and feeding wheel a flute may be completely ground from the solid in a matter of seconds. When the first flute has been completed the wheel is withdrawn, the work-spindle is caused to index and the grinding of the next flute proceeds. By this invention a completely finished fluted and sharpened tool such as an end mill is produced from hardened bar stock in one set-up including grinding to size and in a matter of moments as compared with the much longer prior methods of successive milling and sharpening operations.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure, and in such drawings, like characters of reference denote corresponding parts throughout all the views, of which:

Figure 1 of the drawings illustrates diagrammatically a representative form of grinding apparatus having mounted in a chuck a bar of end mill stock that has been previously hardened and its shank end ground between centers to the finished diameter desired for the end mill.

Figure 2:
Figs. 2–5 are views illustrating progressive stages in the grinding of a complete flute.
Figure 3:
Figure 4:
Figure 5:
Figure 6:
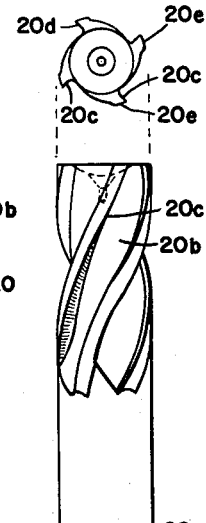
Fig. 6 is an elevation and end view of a completely ground 4-flute end mill.

Representative stages of the formation of a single flute in end-mill are illustrated in Figs. 1–5 in which the numeral 20 indicates a bar of end-mill stock that has been previously cut to length, hardened, and its shank 20a ground between centers, the portion to be fluted may be left unground if desired. A bar of this character is inserted in a suitable chuck or collet indicated at 21 which is adapted to be oscillated and reciprocated and on occasions angularly indexed, and on other occasions rotated between indexing movements. The length of the reciprocatory stroke may be varied to suit the flute length and may desirably be controlled by cam means indicated at 22 or other form of mechanism that affords a high degree of accuracy. The rotary motions in forward and reverse directions may be brought about preferably by a helically wound band and reciprocable-slide mechanism indicated at 23, tho resort may be had to other means. In the mechanism suggested, forward and reverse angular motion imparted to the work spindle 21 causes the spindle to travel axially a fixed distance at a rate determined by the cam means 22 and the rate of climb of the cam determines the helix angle of the groove 20b to be ground in the stock 20. The foregoing mechanisms may be carried preferably in an indexible housing 25, the rotary and indexible movements of which may be controlled and actuated by a worm and gear transmission such as 26 and an index plate such as 27.

The grind wheel is indicated at 28 and is angularly adjustable on a reciprocable slide 29 that is movable on ways 30 in a direction generally radially of the axis of the work 20. The means for effecting rotation of the wheel, its reciprocatory movements between indexing of the work spindle, and the means for adjusting the wheel to the helix angle desired, either left or right, may take such form as one may desire and need not be elaborated upon insofar as the invention of the end mill article and flute forming method here disclosed is concerned.

Figures 7, 8:
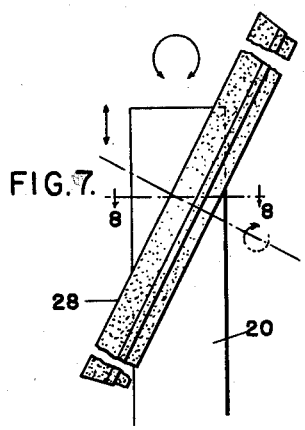
Fig. 7 is a diagrammatic view illustrating representative relations of the work and wheel.
Fig. 8 is a diagrammatic sectional view of the zone of engagement of the wheel with the work and of the wheel dressing tool with the wheel.

Suffice it to say that a blank piece of stock 20 is first clamped in the collet of the work spindle 21, a cam and follower means 22 selected for length of flute required for the finished end mill, and the spindle oscillating means 23 is angularly adjusted and clamped in accordance with the rate of climb of the cam. The plane of the grind wheel 28 is then adjusted and clamped at the proper helix angle of the flutes 20b to be formed and slightly offset from a true radial line as illustrated in Figs. 7 and 8.

When all adjustments are properly made a work coolant agent is applied and the work caused to be profusely flushed as the grinding proceeds. For convenience in making the settings above described the wheel carriage 29 may be caused to occupy a withdrawn position but when the first flute forming cycle is initiated the rapidly rotating wheel is caused to advance toward the work and begin the grinding operation upon the flooded work. Simultaneously the work is caused to rotate backwards and forwards and at the same time reciprocate axially at a relatively rapid rate. The initial contact of the wheel with the work thus causes the latter to grind a shallow helical line on end mill blank and on each pass of the work this helical line takes on a curvature and becomes deeper and deeper until the full length of the flute 20b has been reached. The method herein disclosed requires on the order of 200 passes of the work per flute and it is proposed therefore that the wheel be continuously dressed as the grinding progresses, the dressing being done preferably in a plane perpendicular to the axis of the work rather than axially of the wheel.

After the wheel has reached the required depth in the stock it is caused to be withdrawn and the work indexed one position as, for example, by the worm gear and index means 26, 27 to present a new portion of the work to the wheel. The cycle is again instituted and the grinding of the second flute 20b in the work-piece is caused to occur in the same manner as above explained. A 4-fluted end-mill may be ground from the solid in this manner with but four indexing movements, a 3-fluted tool with three indexing movements, and a 2-fluted tool with but two indexing movements.

Figures 1, 10:
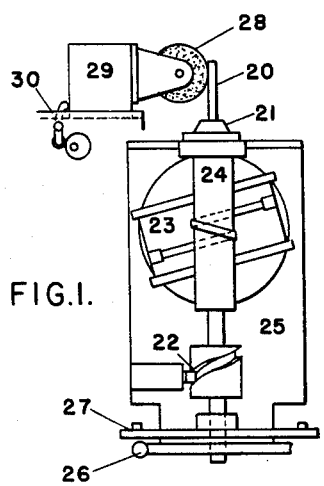
Fig. 10 is a transverse sectional view of work and wheel relations in developing flutes by a combined generating and forming method.

However, with 2-fluted workpieces, a third movement may be given to the work, namely, a rotary movement between indexes, superposed upon the oscillating movements. In other words during the oscillatory and reciprocatory movements the work is caused to creep angularly a preselected number of degrees so that during a portion of the flute development the wheel is generating a cylinder at the core of the tool, the purpose and effect of which is to obtain proper tooth spacing and a strong core or body to back up each cutting edge 20c of the finished end mill. Fig. 10 illustrates diagrammatically the superposed movement and in which the zone a is the portion that is generated into a cylinder.

Figure 9:
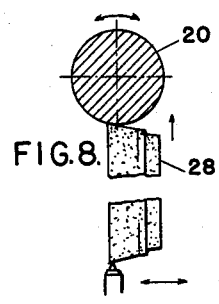
Fig. 9 is a profile view of a wheel dressing cam.

The method herein explained involves, broadly, two cylinders on crossed axes engaging one another and one of which is given a rotary and axial motion in reverse directions while the other only revolves and is progressively fed radially inwardly. Flute contour, by which is meant the cutting edge 20c of the finished tool, the rake angle 20d and chip groove 20b leading in a continuous curve and forming land and clearances 20e at the cutting edge of a preceding flute, is formed to some extent by the shape developed on the wheel contour and to some extent by the crossed axes relation of wheel and work. The crossed axes relation causes theoretical zones of interference that are removed as fast as they appear by oncoming and leaving portions of the wheel in the region of engagement, and since the work, with the present method of grinding, is never stationary but continually rotating and moving axially, the resulting flute form is a blend of curves from cutting edge to cutting edge using a wheel having a simple angular profile that may be easily dressed and maintained in true form. A representative shape of wheel profile taken in a plane perpendicular to the axis of the work is illustrated in Fig. 8 and an enlarged view of a cam for grinding a diamond dresser to maintain that form is illustrated in Fig. 9. This simple wheel profile together with the angular relations and motions explained produce the continuous curve on the flute contour. Moreover, the present method of producing an end mill by grinding from the solid has the further advantage that the grind marks follow the helix of the flute 20b at the cutting edge 20c thereby producing a smooth sharp edge devoid of the raggedness that is produced by transverse grinding. For the same reason the grind marks in the chip groove follow the helix and promote the expulsion of the chips. These features together with the fact that the forming of the flutes by the present single-operation grinding method produces a polished surface from cutting edge to cutting edge and one that is a composition of curves both circumferentially and axially. Such features impart a degree of strength and freedom and ease in action in the present tool that is unsurpassed in tools made by other processes. It will be seen further that the method herein disclosed produces a finished article, i.e., one that is sharpened and ground to size in the course of forming the flutes in the bar. The only remaining step or operation required to complete the tool is that of backing off the extreme ends of the flutes to provide end cutting lips. The continuous flooding of the work with a coolant during the flute grinding operation prevents generation of heat and consequent distortion and no corrective measures need be taken on or to the end mills produced by this improved method.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claim.

Having thus revealed this invention, I claim as new and desire to secure the following combinations and elements, or equivalents thereof, by Letters Patent of the United States:

A fluted cutting tool comprising a body portion having angularly spaced helical cutting edges extending generally longitudinally thereof and being separated by ground intervening helical curved flutes, each of said flutes extending generally longitudinally of the tool and being defined by a continuously curved undulating surface leading from one cutting edge to the next cutting edge and incorporating all rake and clearance angles in curved and blended form, the grinding lines on said undulating surface being substantially parallel to the helix angle of the flutes.

(References on following page)

References Cited in the file of this patent

UNITED STATES PATENTS

| | | |
|---|---|---|
| 1,702,812 | Cochran | Feb. 19, 1929 |
| 2,129,417 | Gase | Sept. 6, 1938 |
| 2,129,418 | Gase | Sept. 6, 1938 |

FOREIGN PATENTS

| | | |
|---|---|---|
| 469,235 | Great Britain | July 21, 1937 |

OTHER REFERENCES

Wel-don Tools Catalog No. 7–A, June 1936 by the Wel-don Tool Co., 321 Frankfort Ave., Cleveland, Ohio.